United States Patent [19]

Druffel

[11] 4,358,635

[45] Nov. 9, 1982

[54] WIREWAY

[75] Inventor: James B. Druffel, Oakland, Calif.

[73] Assignee: Prescolite, Oakland, Calif.

[21] Appl. No.: 226,238

[22] Filed: Jan. 19, 1981

[51] Int. Cl.³ .................. H02G 3/04; F21S 1/02; F21V 21/00; F21V 25/04

[52] U.S. Cl. ................ 174/101; 138/163; 174/68 C; 362/147; 362/365; 362/375

[58] Field of Search ............ 174/52 R, 68 C, 70 R, 174/101; 362/147, 148, 150, 295, 364, 365, 366, 374, 457, 802; 138/157, 163

[56] References Cited

U.S. PATENT DOCUMENTS

| | | | |
|---|---|---|---|
| 3,091,687 | 5/1963 | Papsdorf | 174/52 R X |
| 3,158,329 | 11/1964 | Wince | 362/365 X |
| 3,161,722 | 12/1964 | Wellens et al. | 174/68 C X |

FOREIGN PATENT DOCUMENTS

| | | | |
|---|---|---|---|
| 588794 | 12/1959 | Canada | 362/365 |
| 607801 | 11/1960 | Canada | 362/365 |

*Primary Examiner*—Laramie E. Askin
*Attorney, Agent, or Firm*—Bielen and Peterson

[57] ABSTRACT

A wireway for supporting at least one wire and a temperature sensitive device designed to interrupt the flow of electrical energy through the wire in conjunction with a selected temperature within a compartment connected to the wireway. The wireway includes a raceway having an enclosed channel with a pair of open ends. The temperature sensitive device is confined within a wireway which includes means for conducting heat from the interior of the compartment to the channel of the raceway. The wireway is also supported by the compartment to form a structural unit.

10 Claims, 4 Drawing Figures

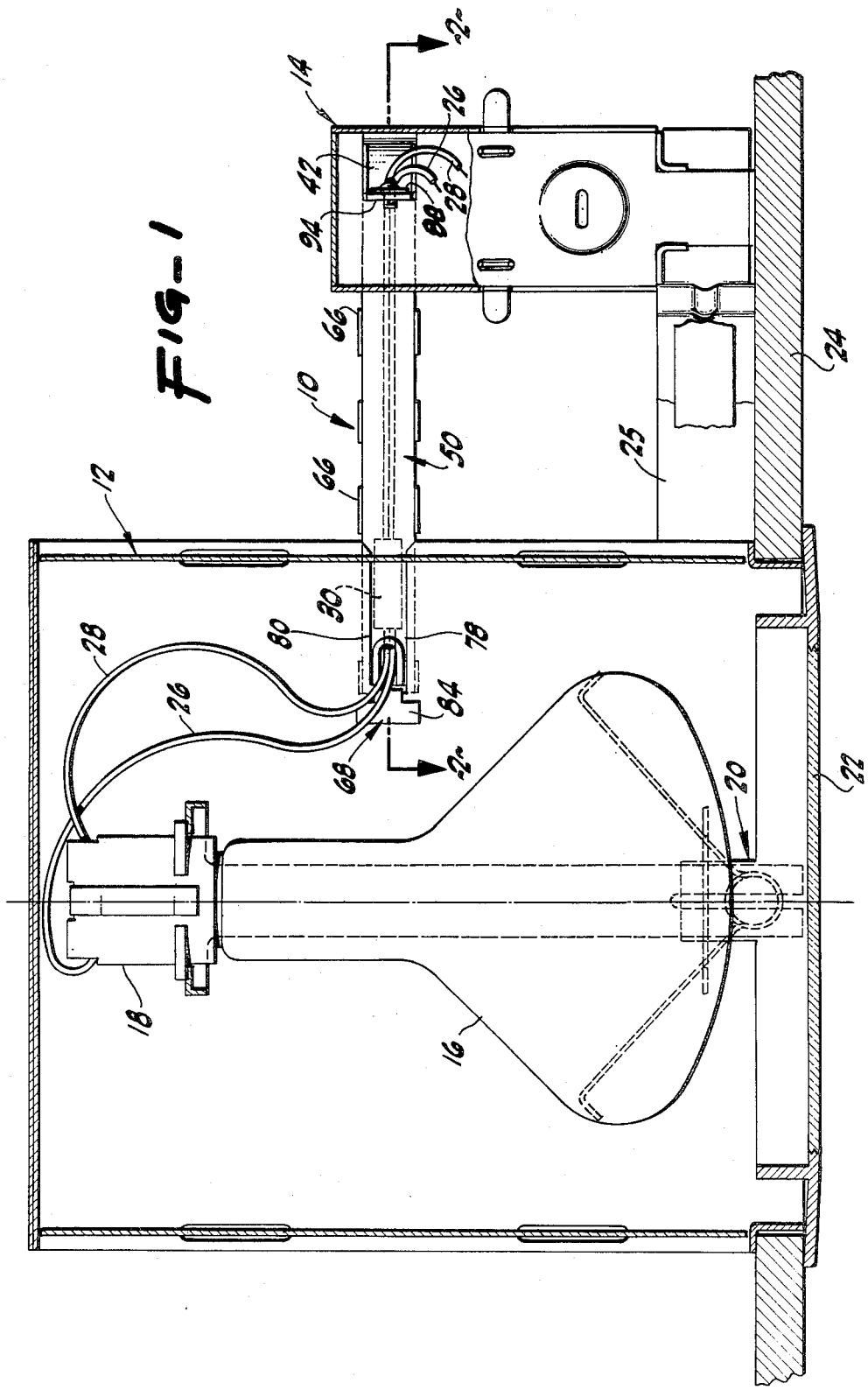

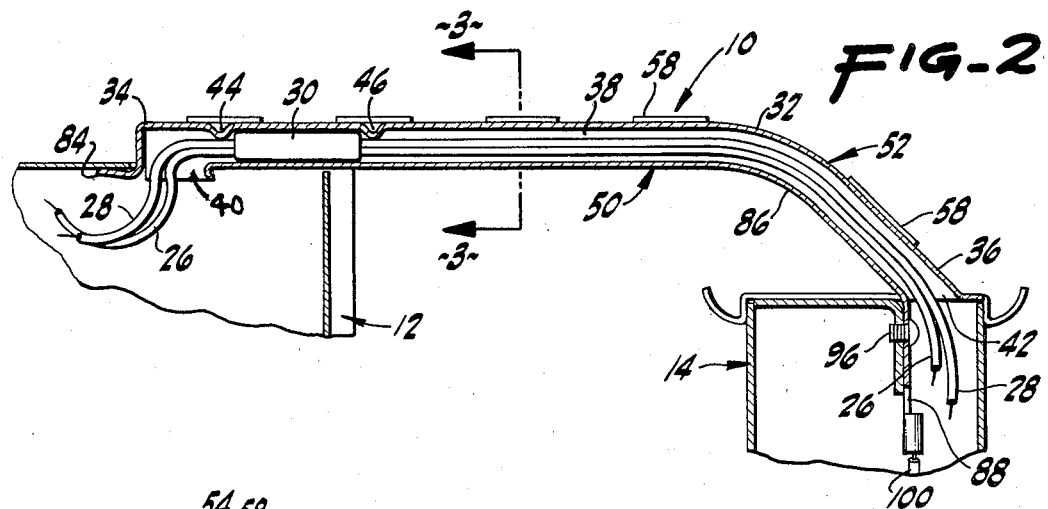
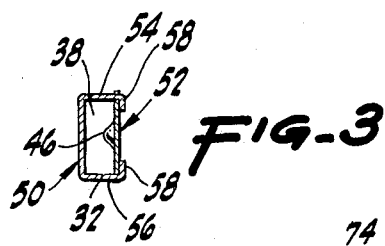
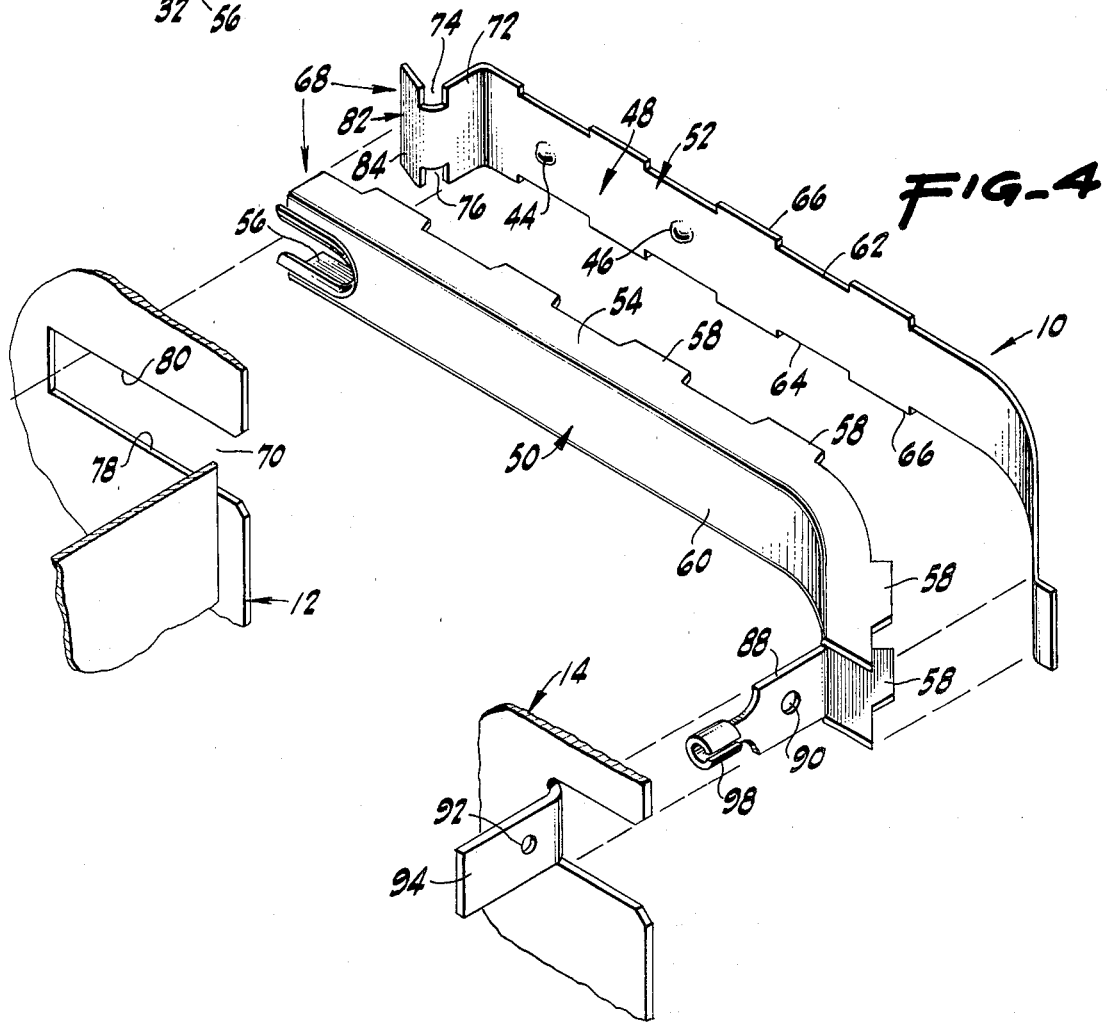

WIREWAY

BACKGROUND OF THE INVENTION

The present invention relates to a novel wireway which is particularly useful in conjunction with a compartment holding a recessed lighting fixture and a thermostat for interrupting electricity to the recessed lighting fixture upon the detection of excess heat in the compartment.

It is often necessary to use a thermal protection device to actuate a safety mechanism in the case of a change in temperature within a compartment. This situation is applicable to a recessed lighting fixture where a concern exists for the generation of excess heat therewithin. It has been found that the thermoprotector or thermostat is best positioned immediately outside the housing containing a recessed lighting unit. Since the thermostat would be used in conjunction with electrical wiring leading to the recessed lighting fixture, a safe enclosure for both items would be necessary to meet the standards of most electrical codes. It would also be necessary to insure that the temperature within the housing of the recessed lighting unit be accurately transmitted to the thermostat immediately adjacent the recessed lighting housing.

A wireway or conduit solving these problems would be a marked advance in the sate of the art in the electrical lighting field.

SUMMARY OF THE INVENTION

In accordance with the present invention a novel and useful wireway for supporting to a compartment at least one wire and a temperature sensitive device which interrupts electrical flow through the wire commensurate with a selected temperature within the compartment is provided.

The wireway of the present invention employs a raceway which has a first end portion and a second end portion with corresponding first and second openings to a channel between the end portions. The channel would be sized large enough to enclose at least one wire and the thermostat therewithin. As a housing for a recessed lighting fixture is often placed near a junction box, the raceway could also be structurally connected to the junction box. In addition, means would be provided for supporting the wireway to the compartment without exposing any wire between the compartment or housing and the junction box.

In addition, means is provided for confining the temperature sensitive device within the channel of the raceway such that movement of the same is severely restricted. Thus, an accurate temperature measurement may be obtained, especially if the wireway of the present invention were mass produced.

Further, means is provided for conducting heat from the interior of the compartment to the channel of the raceway. Where the wireway is supported to the compartment by a notched member fitting within a slot in the compartment, the means for conducting heat from the interior of the compartment may take the form of a tongue which is an extension of the notched member. In addition, the notched member may be resiliently attached to the raceway which provides a tolerance required for assembly of the wireway in conjunction with the compartment on a mass scale.

The raceway may be formed into first and second sections which have a plurality of teeth or tabs along the edges of each. Such teeth would meshingly engage one another to form a raceway with a channel therewithin, heretofore described. One of the sections could include a pair of protuberances sized such that the thermostat would be confined therebetween after assembly of both sections. In addition, the raceway could include a bracket or other means for fastening the second end portion to the junction box such that a structural unit is formed among the compartment, wireway, and junction box.

It may be apparent that a novel and useful wireway used in cooperation with a recessed lighting fixture having thermostatic protection has been described.

It is therefore an object of the present invention to provide a wireway for supporting to a compartment at least one wire and a temperature sensitive device for interrupting electrical flow through the wire at a selected temperature within the compartment which may be easily and accurately manufactured on a large scale.

It is as another object of the present invention to provide a wireway for supporting to a compartment at least one wire and a temperature sensitive device for interrupting electrical flow through the wire at a selected temperature within the compartment which functions as a safety mechanism to prevent heat buildup within a recessed lighting fixture housing and which operates accurately and predictably.

It is another object of the present invention to provide a wireway for supporting to a compartment at least one wire and a temperature sensitive device for interrupting electrical flow through the wire at a selected temperature within the compartment which forms part of a structural unit between a recessed lighting fixture housing or compartment and a junction box often used in cooperation with the recessed lighting fixture housing.

It is yet another object of the present invention to provide a wireway for supporting to a compartment at least one wire and a temperature sensitive device for interrupting electrical flow through the wire at a selected temperature within the compartment which permits the flow of heat from the compartment or, in the case of a recessed lighting fixture, the fixture housing by means of conduction as well as convection.

The invention possesses other objects and advantages especially as concerns particular characteristics and features thereof which will become apparent as the specification continues.

BRIEF DESCRIPTION OF THE DRAWINGS

FIG. 1 is a sectional view of the wireway of the present invention used in cooperation with a recessed lighting fixture housing and a junction box.

FIG. 2 is a broken sectional view taken along line 2—2 of FIG. 1.

FIG. 3 is a view taken along line 3—3 of FIG. 2.

FIG. 4 is an exploded perspective view of the wireway of the present invention in conjunction with parts of the recessed lighting fixture housing and a junction box.

For a better understanding of the invention reference is made to the following detailed description which should be referenced to the hereinabove described drawings.

DESCRIPTION OF THE PREFERRED EMBODIMENTS

Various aspects of the present invention will evolve from the following detailed description of the preferred embodiments thereof which should be taken in conjunction with the hereinabove described drawings.

The invention as a whole is represented in the drawings by reference character 10. The wireway 10 is usually employed in cooperation with a recessed lighting fixture housing 12 and a junction box 14. Housing 12 includes a recessed lamp 16 which is held in an electrical socket 18. A retainer mechanism 20 holds lamp 16 and socket 18 to housing 12. Lens 22 permits light to travel from lamp 16 to the area below being illuminated thereby. Housing 12 and junction box 14 are mounted to a wall or ceiling 24. Bracket 25 connects junction box 14 to housing 12.

A pair of wires 26 and 28 lead from socket 18 to junction box 14 via wireway 10. A temperature sensitive device 30 is connected in series with wires 26 and 28 to interrupt the flow of electrical power therethrough upon the reaching of a certain temperature within housing or compartment 12. For example, a bimetal strip thermostat manufactured by Portage Electric of Akron, Ohio, Series M, would serve this purpose. Wireway 10 includes a raceway 32 having a first end portion 34 and a second end portion 36 with an enclosed channel 38 therebetween. Openings 40 and 42 serve as entrances to channel 38 at first and second end portions 34 and 36 respectively. A pair of protuberances 44 and 46 serve as means 48 for confining thermostat 30 within channel 38, FIGS. 2 and 3.

In the embodiments shown in the drawings, wireway 10 is depicted as being formed from two sections 50 and 52, FIG. 4. First section 50 includes a pair of edge portions 54 and 56 which have a plurality of tabs or teeth 58 therealong. First and second edge portions 54 and 56 are bent in relation to structural member 60 connected thereto. In addition, second section 52 includes a pair of edge portions 62 and 64 having a plurality of teeth or tabs 66 which meshingly engage the teeth along edge portions 54 and 56 of first section 50. First section 50 is easily mated with second section 52 by crimping teeth 58 or 66 onto the adjacent section.

Means 68 supports wireway 10 to compartment or housing 12. Means 68 may take the form of providing compartment 12 with a slot 70 along one wall thereof. First end portion 34, specifically second section 52 thereof, may include a member 72 having a pair of notches 74 and 76, FIG. 4. With reference to FIGS. 1 and 2, it may be seen that notched member 72 slidingly engages edge portions 78 and 80 such that wireway 10 slides alongside of compartment 12 leaving a substantial portion of thermostat 30 aligned with slot 70 behind structural member 60. Thus, thermostat 30 more easily detects the temperature of air within compartment 12 adjacent structural member 60. Notched member 72 may be resiliently attached to second section 52 thus allowing a certain degree of tolerance in the assembly of wireway 10 in conjunction with compartment 12. It should be noted that opening 40 along first section 50 includes a mouth which projects a short distance into compartment 12. Warmed air within compartment 12 would easily pass or convect from compartment 12 to channel 38 and temperature sensitive device 30 therewithin.

Moreover, wireway 10 also includes means 82 intended for conducting heat from the interior of compartment 12 to channel 38. Means 82 may take the form of a tongue 84 connected to the notched member 72 and extending therefrom adjacent the inside of compartment 12 after assembly of wireway 10, FIG. 2. Thus, temperature sensitive device 30 would also receive the heat conducted along second section 52 in the performance of this function. With reference to FIGS. 2 and 4 it may be seen that wireway 10 includes a bent portion 86 which fastens to junction box 14 by means of a tab 88. One of the openings 90 aligns with openings 92 within bracket member 94 of junction box 14. Fastening means 96 holds tab 88 to bracket 94. Tab 88 includes a split end portion 98 which may be crimped around ground wire 100, FIG. 2.

In operation, wireway 10 is assembled by mating first section 50 with second section 52 and the teeth 58 and 66 of those portions. Wires 26 and 28 as well as thermostat 30 are placed within channel 38 before this mating process and held in place by crimping teeth 58 or by other means known in the art. Thermostat 30 would be confined between protuberances 44 and 46 at this point. Notched member 72 is slid into slot 70 positioning thermostat 30 as shown in FIG. 2. At this point, heat from compartment 12 would travel to thermostat 30 by convection through opening 40, by conduction from tongue 84 through second section 52, and by conduction directly through structural member 60 of first section 50. Wires 26 and 28 are then lead into junction box 14 for splicing in a known manner. Wireway 10 is fastened to junction box 14 by the use of tab 88 and bracket 94 of junction box 14 and by the use of fastener 96. Wireway 10 would, at this point, be able to interrupt the flow of electrical current from a source (not shown) entering junction box 14 and leading to socket 18 holding lamp 16. Such interruption would occur when the temperature within compartment 12 reaches an unacceptable level.

While in the foregoing specification embodiments of the invention have been set forth in considerable detail for the purposes of making a complete disclosure thereof, it may be apparent to those of ordinary skill in the art that numerous changes may be made in such details without departing from the spirit and principles of the invention.

What is claimed is:

1. A wireway for supporting to a compartment at least one wire and a temperature sensitive device for interrupting electrical flow through the wire at a selected temperature within the compartment comprising:
    a. a raceway having a first end portion and a second end portion with walls forming an enclosed channel therebetween, said raceway further including a first opening at said first end portion and a second opening at said second end portion;
    b. means intended for confining the temperature sensitive device to a position within said channel of said raceway;
    c. means intended for conducting heat from the interior of the compartment to said channel of said raceway and;
    d. means intended for supporting said wireway to the compartment.

2. The wireway of claim 1 in which said means intended for supporting said wireway to the compartment comprises said first end portion of said raceway provided with a member having a pair of notches for slidingly engaging with a slot formed in the compartment.

3. The wireway of claim 2 in which said means intended for conducting heat from the interior of said compartment to said channel of said raceway comprises a tongue connected to said notched member such that said tongue lies substantially inside the compartment when said notched member slidingly engages said slot of the compartment.

4. The wireway of claim 3 in which said notched member is resiliently attached to said first end portion of said raceway.

5. The wireway of claim 4 in which said first opening of said enclosed channel is positioned such that said first opening will communicate directly with the inside of said compartment at a selected point when said sliding engagement of said notched member with said slot in the compartment take place.

6. The wireway of claim 5 in which said means intended for confining the temperature sensitive device comprises a pair of protuberances spaced along said raceway enclosed channel a sufficient distance to permit the temperature sensitive device to lie therebetween.

7. The wireway of claim 6 in which said raceway is formed from a first and second section, said first and second sections including a plurality of teeth on each section which meshingly engage one another.

8. The wireway of claim 7 in which said second end portion of said raceway includes means for securing said second end portion in relation to the compartment.

9. The wireway of claim 8 in which said means intended for supporting said wireway to the compartment including said sliding engagement of said slot of the compartment by said notched member also includes means for placing a portion of the temperature sensitive device within said channel in alignment with said slot.

10. The wireway of claim 9 in which said second end portion additionally includes a split end capable of being crimped onto an electrical wire.

* * * * *